July 29, 1941.   M. MEUNIER   2,251,195
DUST GUARD FOR JOURNAL BEARINGS
Filed March 10, 1939
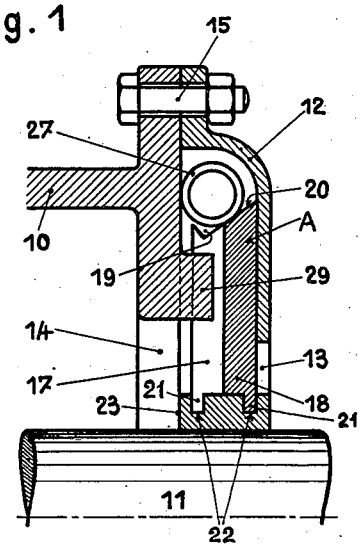
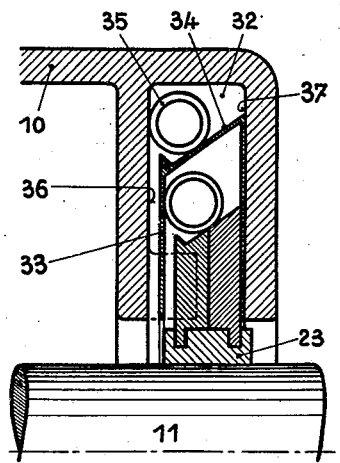
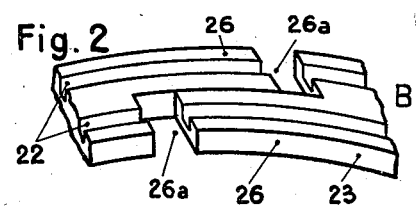
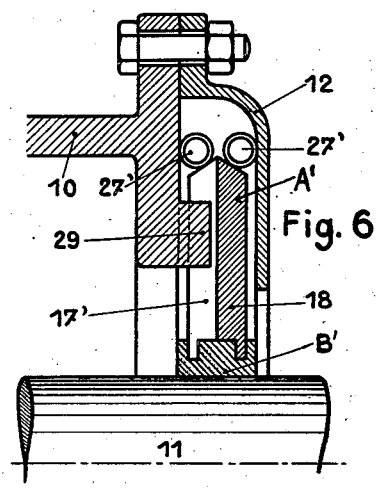
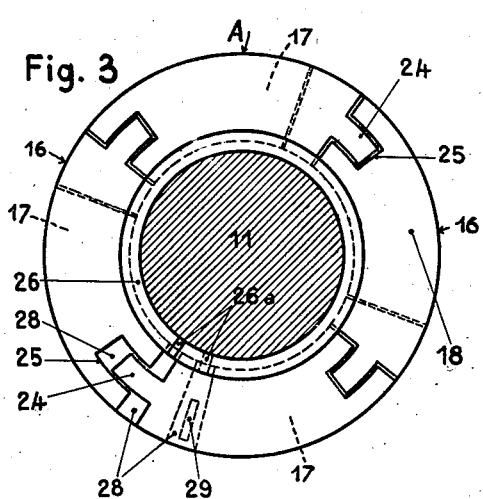
INVENTOR
MARCEL MEUNIER,
By Wolcott & Groff, Attys.

Patented July 29, 1941

2,251,195

UNITED STATES PATENT OFFICE 2,251,195

DUST GUARD FOR JOURNAL BEARINGS

Marcel Meunier, Levallois-Perret, France

Application March 10, 1939, Serial No. 261,108
In Switzerland March 14, 1938

2 Claims. (Cl. 286—6)

This invention relates to dust guards for journal bearings, including journal boxes for the axles of railroad vehicles.

While dust guards have been heretofore made comprising rigid or semi-rigid wall portions used, with or without an axle engaging sealing ring, and which depend for their efficiency upon elastic pressure to maintain a dustproof joint about the axle, nevertheless, previous devices, so far as is known, are open to the objection that they cause the concentration of too much friction on the shaft; and, in many cases, the rotation of the axle or shaft tends to increase such friction due to the wedging or jamming action incident to the relative movement of the parts forming the wall or plate portion of the guard. Consequently, there is relatively quick wear and tear of the sealing element as well as of the shaft itself where they engage, especially if mineral dust adheres to or becomes imbedded in the material forming the seal. On the other hand, it has also been difficult to obtain a tight and satisfactory closure, because of the joints occurring between the different parts which generally form the shield or guard, or because of the play or tolerance which must be provided to allow the relative movement of the shaft in respect to the bearing, as, for instance, in the case of journal boxes used on railroad vehicles.

Accordingly, the present invention has in view a simple and practical construction which remedies the disadvantages set forth, and to that end the shaft is surrounded where it emerges from the bearing by supple and yielding means in the form of a split collar or ring arranged to form an annular joint which is held in position by at least one element of a sectional plate or disk arranged to continuously exert pressure concentrically thereon. This assures the holding of the annular element or collar properly around the shaft by pressure while at the same time the plate or disk is held between or against the walls of the bearing or box to prevent lateral shifting of the collar, that is, shifting parallel to the axis of the shaft or axle.

A preferred and practical embodiment of the invention is shown in the accompanying drawing, in which:

Figure 1 is a partial sectional elevation of one form of construction.

Figure 2 is a detail perspective view of a portion of the split collar.

Figure 3 is a detail side elevation of the annular dust guard wall or plate comprising a plurality of segments having inner and outer sections.

Figure 4 is a detail sectional view illustrating the use of a shim plate to carry the abutment or stop for engaging certain of the segments of the plate.

Figure 5 is a vertical sectional view of a modified form of construction wherein the dust guard shown in Figure 1 is placed within a casing thereby to be handled as a unit for insertion in railway journal boxes now in use and having an integral dust guard receiving pocket.

Figure 6 is a detail vertical sectional view illustrating a modification shown in Figure 1 wherein two springs are used for radially pressing the segments toward the sealing collar.

Similar reference characters designate corresponding parts throughout the several figures of the drawing.

In the examples shown by Figures 1 to 3, 10 indicates the extremity of the journal box of a lubricating bearing, and 11 designates the shaft adapted to revolve in the bearing. Upon the body of the box 10 there is provided a hood 12, having a central hole 13 concentric to the hole 14 of the body of the box. The said hood 12 is held in position by the bolts 15.

In its primary aspect, the relatively movable or self adjusting parts of the dust guard are designated generally as A and B, the former being in the nature of a sectional disk or plate and the latter in form of a split and flexible or yielding sealing collar.

Referring first to the circular or disk-like member A, it will be seen from Figure 1 that it is located in the chamber or space provided between the body of the box 10 and the hood 12. Said member consists of a plurality of rigid segments 16 each of which consists of two sections 17 and 18, made for example, of aluminum, held together by appropriate means, such as rivets or the like. Each inner section 17 has at its external periphery a groove 19 consisting of two inclined planes, and the external periphery of each outer section 18 has an inclined surface 20 forming a continuation of one of the walls of the groove 19.

Upon their interior periphery each section 17 and 18 has a circular rib 21 intended to fit into corresponding grooves 22 of the sealing collar B whose body 23 may be of flat elongated cross-section and made of any suitable material such as leather, rubber, rubber composition, or in fact any substance having sufficient stamina and flexibility to conform closely to the outer periphery of the axle 11.

In order to assure the necessary relative adjustability of the segments 16, while at the same time insuring complete dust tightness, one radial side edge of each section 18 is provided with a tongue 24 and the other radial side edge is provided with a recess 25 of corresponding size. Thus, when the segments are assembled the tongue 24 of each section fits freely into the recess 25 of the adjacent section, in mortise and tenon fashion, as shown in Figure 3.

The sections 17 are formed with straight radial side edges, and, as will be apparent from Figure 3, they are so positioned angularly with regard to the sections 18 that they cover or cross the joint formed by the mortise and tenon connections formed by the tongues 24 and recesses 25. In this manner a supple or flexible self-adjusting, and simultaneously tight plate or dust excluding wall assemblage is obtained.

In order to obtain and maintain uniform tightness and relative circumferential adjustment for the collar B forming the axle engaging part of the guard, the two extremities of the body 23 are cut on mating medial and transverse planes. Thus split, the adjacent ends of the ring are formed with laterally overlapping tongues 26, in such a manner that a tight joint permitting the necessary circumferential expansion and contraction of the ring is possible, as shown in Figure 2.

The segments 16 are held yieldingly on the ring B about the shaft 11 by a helical ring-shaped coil spring 27. As shown in Figure 1 this spring, which surrounds the four segments 16, has a diameter sufficient to rest at one side upon the inclined surface 19—20 while the other side engages the wall of the body of the box 10 in such a manner that the lateral exterior face of the sections 18 are urged or pressed against the inner face of the wall of the hood 12, thus making a dust-proof vertical joint, and also holding the collar B against lateral displacement along the axle or shaft.

In order to provide play necessary for the device to function so that the joint between the shaft 11 and sealing collar B remains tight, even in case of wear and tear, the dimensions of the collar as well as of the segments 16 are calculated in such a maner that, when these are once assembled, sufficient tolerance or space is provided at the points 26α and 28 (Figs. 2 and 3), respectively, between the extremities of the collar and the segments.

A lug 29 attached solidly to the wall of the body of the box 10 projects into the free space 28 between the extremities of the sections 17 of the segments 16 thereby to form a stop against which one of the radial side walls of one of the sections 17 rests, corresponding to the direction of the rotation of the axle. The stop 29 is, of course, located close to the end spaces or clearances 26α of the ring B in order to permit the said ring to readily contract and seal the periphery of the axle.

The operation of the device shown in Figures 1-3 is as follows:

The circular wall or disk A comprising the segments 16 is assembled upon the split collar B which surrounds the shaft 11, as shown in Figure 3, and said segments are elastically held in position by the helical spring 27 surrounding their outer edges. As shown in Figure 1, the spring 27 rests against the wall of the body of the box, and also rests upon the incline formed by the surfaces 19 and 20 of the sections 17 and 18 of the segments 16. Thus, the segments forming the plate or disk A are yieldingly pressed against the interior surface of the hood 12. This establishes a closure preventing the passage of dust. On the other hand, as no space exists between the segments 16, or between the extremities of the collar B, the joint is tight at the point where the shaft 11 leaves the box 10.

As may be readily understood, the rotation of the shaft 11 tends to jam the segments 16 against each other, and, consequently, there is a tendency to produce an undesirable friction between the sealing ring B and the shaft 11. In order to avoid this result, the stop or abutment 29, located in the radial space 28 between certain of the side edges of the inner sections 17, first, prevents axial displacement in the direction of rotation of all of the segments 16; and, secondly, permits movement which tends to loosen the elements above the stop, thereby tending to temporarily counteract the action of the spring 27. In this way, there is simultaneously obtained a tight joint and an appreciable reduction of friction.

A slight modification of the invention is shown in Figure 4 wherein the dust guard construction heretofore described, and consisting of the circular wall or disk A including a plurality of segments composed of the sections 17 and 18, the collar B, and spring 27, may be located in a chamber 30 formed by the hood 12 and an annular shim plate or similar part 31 fitted to the interior side wall of the box. In this case the inner surface of the shim plate carries the stop or abutment 29. This form of construction permits assembling the whole dust shield in advance and threading it upon the shaft 11 to be covered by the hood 12, as indicated.

Figure 5 illustrates a construction which makes possible the use of the features heretofore described in axle boxes of railroad cars, now in use. As will be observed from this figure, a dust guard made in accordance with the present invention may be placed in the chamber 32 which was formed with the body of the box 10 when it was made. That is to say, the complete assembly of parts, as described in Figure 1, may be placed in an annular casing 33 and handled as a unit. This casing has an inclined surface 34 at its periphery, and the helical spring 35 rests thereon. This spring has one side or portion resting against the wall 36 of the chamber 32 and thus presses the casing 33 against the opposite wall 37, thereby establishing a joint which prevents the passage of dust.

In the modified construction shown in Figure 6 the principles of construction are the same with respect to the body 23 of the split collar B surrounding the shaft, but, the peripheral edges of the sections 17' and 18' of the segments are each inclined toward their outer faces, starting from the medial plane of the dust shield. In this case, two springs 27' are provided, each of which rests upon one of the inner surfaces of the chamber enclosing the dust shield and also upon one of the inclined peripheral edges of the sections 17' and 18'. While in Figure 1 the desired lateral tightness is obtained due to the spring 27 pressing one face of the dust shield against the inner wall of the hood 12; nevertheless, in this construction, the springs 27' themselves form a dual dust barrier. This construction also provides a completely tight closure for the bearing, permitting without damage, all of the necessary relative play of the shaft 11 with respect to the body of the box 10.

In order to protect the springs 27, 27' and 35, stiff grease may be introduced into the hood which shelters the spring. Also, it will be apparent that in place of the spring, any other elastic element, such as bands or rings of rubber or their equivalent, may be used.

Moreover, to avoid the angular displacement of the sealing collar B in respect to the segments 16 of the circular dust guard wall, suitable stops or abutments may be provided upon the segments themselves, said stops coming in contact with a portion of the box housing when the assembly is complete, or, as a further alternative the sealing ring may be attached permanently to one of the segments 16.

Instead of making the outer edges of the segments on the true arc of a circle they may have a different curvature in such a way to produce, for example, a body of general oval form, with a circular central hole cooperating with the sealing ring.

Without further description it is thought that the features and advantages of the invention may be readily understood, and it will, of course, be apparent that changes may be resorted to within the scope of the appended claims.

I claim:

1. In a dust guard for journal boxes, the combination with an axle and a housing having laterally spaced walls, of a flexible split sealing collar on the shaft and having a plurality of grooves therein, an annular plate having a plurality of segments arranged concentrically about the collar, said segments each comprising inner and outer sections having disalined radial side edges whereby the joints in the plate between the segments are masked respectively by the inner and outer sections, ribs on each of said sections of the segments forming continuous tongues adapted to enter the grooves on the collar, said segments each having its outer edge bevelled to face one of said walls, and an annular elastic element circumferentially engaging the plate and tending to move the segments thereof radially into contact with the collar, said elastic means comprising an endless coiled compression spring engaging the bevelled edges and the wall toward which they face.

2. In a dust guard for journal boxes, the combination with an axle and a housing having laterally spaced walls, of a flexible split sealing collar on the shaft, a casing having opposite side walls and an inclined peripheral edge wall, said casing being located between the spaced walls of the housing, an annular elastic element having a portion bearing against one side wall of the housing and the edge wall of the casing thereby to shift the casing toward the opposite side wall of the housing, a dust guard plate comprising a plurality of segments adapted for relative radial movement toward the sealing collar, said segments having their peripheral edges bevelled to face the casing wall adjacent the housing wall against which said elastic element bears, and an elastic member surrounding the periphery of the plate simultaneously to press all the segments toward the sealing collar, said last elastic element bearing against the bevelled edges and said casing wall.

MARCEL MEUNIER.